United States Patent
Das et al.

(10) Patent No.: US 7,633,882 B2
(45) Date of Patent: Dec. 15, 2009

(54) AD-HOC NETWORK AND METHOD EMPLOYING GLOBALLY OPTIMIZED ROUTES FOR PACKETS

(75) Inventors: Sujit R. Das, New Berlin, WI (US); Luis R. Pereira, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 603 days.

(21) Appl. No.: 11/347,077

(22) Filed: Feb. 2, 2006

(65) Prior Publication Data

US 2007/0177511 A1    Aug. 2, 2007

(51) Int. Cl.
    *H04L 12/28* (2006.01)
(52) U.S. Cl. .................. 370/252; 370/401
(58) Field of Classification Search .......... 370/400, 370/338, 238, 252, 480, 339, 248, 254, 328, 370/401; 709/220–223, 252
    See application file for complete search history.

(56) References Cited

U.S. PATENT DOCUMENTS

| | | | | |
|---|---|---|---|---|
| 5,412,654 | A * | 5/1995 | Perkins | 370/312 |
| 6,728,214 | B1 * | 4/2004 | Hao et al. | 370/241 |
| 6,850,492 | B2 * | 2/2005 | Chander et al. | 370/235 |
| 7,177,646 | B2 * | 2/2007 | O'Neill et al. | 455/450 |
| 7,386,002 | B2 * | 6/2008 | Meier | 370/449 |
| 2002/0061001 | A1 * | 5/2002 | Garcia-Luna-Aceves et al. | 370/338 |
| 2004/0090943 | A1 * | 5/2004 | da Costa et al. | 370/338 |
| 2004/0213233 | A1 * | 10/2004 | Hong et al. | 370/392 |
| 2004/0233855 | A1 | 11/2004 | Gutierrez et al. | |
| 2004/0246900 | A1 * | 12/2004 | Zhang et al. | 370/238 |
| 2005/0041591 | A1 * | 2/2005 | Duggi et al. | 370/238 |
| 2005/0041676 | A1 * | 2/2005 | Weinstein et al. | 370/401 |
| 2005/0111428 | A1 * | 5/2005 | Orlik et al. | 370/344 |
| 2005/0157661 | A1 | 7/2005 | Cho | |
| 2005/0232281 | A1 * | 10/2005 | Rosenzweig et al. | 370/400 |
| 2005/0257269 | A1 * | 11/2005 | Chari et al. | 726/25 |
| 2006/0062154 | A1 * | 3/2006 | Choy et al. | 370/242 |

(Continued)

OTHER PUBLICATIONS

Lundberg, D., "Ad hoc protocol evaluation and experiences of real world ad hoc networking," Tech. Rep., Department of Information Technology, Uppsala University, 2002, pp. i, ii, 1-44.

(Continued)

*Primary Examiner*—Michael J Moore, Jr.
*Assistant Examiner*—Duc T Duong
(74) *Attorney, Agent, or Firm*—Martin J. Moran

(57) ABSTRACT

An ad-hoc network includes an ad-hoc network coordinator (NC) having a first processor, a first memory, and a first communication interface; and a plurality of ad-hoc network devices (NDs). Each of the NDs includes a second processor, a second memory, and a second communication interface structured to communicate with the first communication interface of the NC or with the second communication interface of at least another one of the NDs. The first processor cooperates with at least some of the NDs to globally optimize a route based on a plurality of link costs for: (i) pairs of the NDs, or (ii) pairs of the NDs and at least one pair including one of the NDs and the NC, in order to minimize cost along the route that: (a) one of the NDs or the NC employs to send a packet to: (b) another one of the NDs or the NC.

27 Claims, 7 Drawing Sheets

U.S. PATENT DOCUMENTS

2006/0245424 A1* 11/2006 Ramanathan et al. ....... 370/389
2007/0147255 A1* 6/2007 Oyman ....................... 370/238

OTHER PUBLICATIONS

Daescu, O., et al., "Gara: A geometry aided routing algorithm," 2004 Workshop on High Performance Switching and Routing, 2004, pp. 224-228.

Hershberger, J., et al., "Vickrey prices and shortest paths: What is an edge worth?," Foundations of Computer Science, 2001, Proceedings. 42nd IEEE Symposium on, Oct. 2001, 8 pp.

Draves, R., et al., "Comparison of routing metrics for static multi-hop wireless networks," Tech. Rep. MSR-TR-2004-18, Microsoft Research, 1999, 12 pp.

Mosko, M., et al., "Loop-free routing using a dense label set in wireless networks," Proceedings of the 24th International Conference on Distributed Computing Systems (ICDCS04), IEEE Computer Society, 2004, 10 pp.

Prakash, R., "Unidirectional links prove costly in wireless ad-hoc networks," Seattle, Aug. 1999, 3rd InternationalWorkshop on Discrete Algorithms and Methods for Mobile Computing and Communications, pp. 15-22.

Vanitchanant, N., et al., "Unidirectionality in ad-hoc networks: a simulation study," MILCOM: Military Communications Conference, Oct. 2003, vol. 2, IEEE, pp. 1298-1304.

Wikipedia, "Dijkstra's algorithm", http://en.wikipedia.org/wiki/Dijkstra%27s_algorithm, 2005, 5 pp.

* cited by examiner

100
RouteDiscoveryClient(i ≠ 0)
1: NeighborDiscovery(i) —102
2: UpdateRoute(i) —104

FIG. 4A

102
NeighborDiscovery(i ≠ 0)
1: $G^i \leftarrow \emptyset$ —106
2: $\Rightarrow$ Beacon_Request() —108
3: while (!TimeOut) do —124
4: $\in^j$ Beacon_Response($c_{ij} = fLC^i(j), c_{ji}$) —126    /127
5: $V^i_{us} \leftarrow V^i_{us} \cup \{j\}$ —128    ~137
6: $E^i \leftarrow E^i \cup \{(i,j)\}$ —130
7: $C^i \leftarrow C^i \cup \{c_{ij}\}$ —132    137
8: $\Rightarrow_j$ Beacon_Confirm() —134
9: end while

FIG. 4B

112
NeighborDiscoveryCoordinate(i)
1: while $V^i_{us} \neq \emptyset$ do —114
2:   if $\in^j$ Beacon_Request() then —116
3:     $\Rightarrow^j$ Beacon_Response($\emptyset, c_{ij} = fLC^i(j)$) —118
4:   end if        ~120
5:   while (!TimeOut) do —138
6:     if $\in^j$ Beacon_Confirm() then —140
7:       $V^i_{ds} \leftarrow V^i_{ds} \cup \{j\}$ —142
8:       $E^i \leftarrow E^i \cup \{(i,j)\}$ —144
9:       $C^i \leftarrow C^i \cup \{c_{ij}\}$ —146
10:   end if
11:   end while
12: end while

FIG. 4C

104
UpdateRoute(i ≠ 0)
1: $gmcn_{i0} \leftarrow \emptyset$ —154
2: $j \leftarrow fLMCN_{us}(i)$ —156
3: $\Rightarrow^j$ Neighbor_Update($G^i$) —158
4: while (!TimeOut) do —162
5:   $\Leftarrow$ Route_Update($gmcn_{i0}$) —198
6: end while
7: ASSERT($gmcn_{i0} \in (V^i - \{i\})$) —202

FIG. 4D

166
RouteDiscoveryService()

1: Initialize: —168
2: $G(V,E) \leftarrow \emptyset, V \leftarrow \{0\}$ —170
3: $SSMCR^0 \leftarrow \emptyset$ —172
4: $SDMCN^0 \leftarrow \emptyset, SDMCN^0 \leftarrow \emptyset$ —174
5: while ( $\Leftarrow$ Neighbor_Update($G^i$)) do —176
6:    $G \leftarrow G - G^i$ —178
7:    $G \leftarrow G \cup G^i$ —180
8:    $SDMCN^0 \leftarrow SDMCN^0$ —182
9:    $SDMCN^0 \leftarrow fSDMCN(0)$ —184
10:    $SSMCR^0 \leftarrow fSSMCR(0)$ —186
11:    for $(i \neq 0)$ do —188
12:      if $gmcn_{i0} \neq \overline{gmcn}_{i0}$ then —190
13:        XmitDownstream(0, $i$, Route_Update, $gmcn_{i0}$, mid) —192
14:      end if —194
15:    end for
16: end while —196

*FIG.4E*

204
XmitUpstream($i \neq 0$, s, Msg$_{us}$, pl, mid)

1: $\Rightarrow^{gmcn_{i0}} Msg_{us}$ ( s, pl, mid) —206

*FIG.4F*

208
ProcessUpstreamMsg(i)

1: while ( ⇐ Msg$_{us}$(s, pl, mid)) do
2:   if i = 0 then
3:     XmitDownstream(i, s, Msg_Confirm, ∅, mid) —210
4:     process Msg$_{us}$ —212
5:   else
6:     XmitUpstream(i, s, Msg$_{us}$, pl, mid) —214
7:   end if
8: end while

*FIG. 4G*

200
XmitDownstream(i = 0, d, Msg$_{ds}$, pl, mid)

1: $\Rightarrow^{gmcnod}$ Msg$_{ds}$($r_{0d}^{gmc} \in SSMCR^0$, pl, mid) —216

*FIG. 4H*

218
ProcessDownstreamMsg(i ≠ 0)

1: while ( ⇐ Msg$_{ds}$($r_{jk}$, pl, mid)) do
2:   ASSERT(i=$r_{jk}$(1)) —220
3:   if i = k then
4:     XmitUpstream(i, i, Msg_Confirm, ∅, mid) —222
5:     process Msg$_{ds}$ —224
6:   else
7:     $r_{ik} = r_{jk} - \{r_{jk}(1)\}$ —226
8:     ASSERT($r_{ik} \neq \emptyset$)
9:     $\Rightarrow^{r_{ik}(1)}$ Msg$_{ds}$($r_{ik}$, pl, mid) —228
10:   end if
11: end while

*FIG. 4I*

AD-HOC NETWORK AND METHOD EMPLOYING GLOBALLY OPTIMIZED ROUTES FOR PACKETS

BACKGROUND OF THE INVENTION

1. Field of the Invention

This invention relates generally to communication networks and, more particularly, to routing algorithms for ad-hoc networks, such as, for example, a multi-hop or a low rate-wireless personal area network (LR-WPAN). The invention also relates to methods of routing communications in a communication network, such as an ad-hoc network.

2. Background Information

The ubiquitous nature of wireless sensor networks (WSNs) in industrial, commercial and residential applications has brought new research challenges in this domain. Among these challenges is an efficient routing scheme suited for low rate WSNs.

The advent of WSNs promises to spread the usage of inexpensive sensing technology in a wide variety of application domains. For example, industrial, commercial and residential areas are quick to adopt that technology. These application domains demand that underlying ad hoc networking technology is self-configurable, scalable and robust. Typically, these applications do not require a relatively large data bandwidth.

The market interest and potential of WSN technology can be judged from many active consortia and standards groups to promote its commercial use. These include, for example, IEEE 802.15.4, Zigbee Alliance and WINA. Most recently, there is formation of a 6Lo WPAN working group under the auspices of IETF.

The sensor networks strive to meet a minimum quality of service specific to the application domain with varying tolerable degrees of message delivery latency and reliability. Many message routing schemes have been proposed for these sensor networks that meet specific quality of service requirements. See, e.g., Lundberg, D., "Ad hoc protocol evaluation and experiences of real world ad hoc networking," Tech. Rep., Department of Information Technology, Uppsala University, 2002, which provides an overview of these routing proposals. Contrary to the perception, many of these routing schemes are difficult to implement in a low-end 8-bit microprocessor with limited memory and processing power. Maintaining the relatively low cost of these sensing devices is the fundamental premise for rapid field adoption. Often, adequate range of sensing coverage cannot be achieved due to a limitation in the number of message hops permitted under a routing scheme. Disproportionately large routing control message overhead also causes poor message latency and throughput in the sensing network.

The lack of an adequate formal analytical framework to specify, verify and guarantee network performance for WSN is proving to be a bottleneck for larger user acceptance. There has been a relatively large body of research work on routing algorithms in other areas, such as, for example, Internet routing protocols. Some of these techniques are based on formal theoretical foundations. See, e.g., Daescu, O., et al., "Gara: A geometry aided routing algorithm," 2004 Workshop on High Performance Switching and Routing, 2004, pp. 224-28 (geometric computing); West, D., Introduction To Graph Theory, Prentice Hall, second edition, 2001 (graph theory); and Kurose, J., et al., Computer Networking: A top-Down Approach Featuring the Internet, Addison Wesley, second edition, 2003 (use of Bellman Ford and Dijkstra's algorithms for Internet routing protocols).

Sensor networks, however, differ from Internet-like broadband networks in many fronts. These networks can handle much lower data rates, typically up to about 250 Kbps. They can tolerate very little routing overhead and need to guarantee better message delivery latency and reliability. In some cases, the nodes in the network are either fully mobile or semi-mobile in the sense that only a small subset of nodes may move around infrequently. Finally, the implementation of the routing protocol should require minimal computing resources. As a result of these differences, it is believed that existing Internet routing strategies cannot be directly applied to sensor networks.

Dijkstra's algorithm solves the single-source shortest path problem for a directed graph with nonnegative edge weights. For example, if the vertices of the graph represent cities and edge weights represent driving distances between pairs of cities connected by a direct road, Dijkstra's algorithm can be used to find the shortest route between two cities. The input of the algorithm consists of a weighted directed graph G and a source vertex s in graph G. Set V is the set of all vertices in the graph G. Each edge of the graph is an ordered pair of vertices (u,v) representing a connection from vertex u to vertex v. The set of all edges is denoted as set E. Weights of edges are given by a weight function w: E->[0, $\infty$]; therefore, w(u,v) is the non-negative cost of moving from vertex u to vertex v. The cost of an edge can be thought of as, or a generalization of, the distance between those two vertices. The cost of a path between two vertices is the sum of costs of the edges in that path. For a given pair of vertices s and t in V, the algorithm finds the path from s to t with lowest cost (i.e., the shortest path). It can also be used for finding costs of shortest paths from a single vertex s to all other vertices in the graph.

Proactive Source Routing (PSR) is a relatively very simple routing protocol designed specifically for mesh networking that can be implemented in a low-cost sensor node. See U.S. Patent Application Publication No. 2004/0233855. PSR is designed to provide a very simple and efficient routing mechanism that can be implemented in an 8-bit embedded processor. In a PSR architecture, one node in the sensor network is designated and acts as a network coordinator (NC). In IEEE 802.15.4 parlance, the NC is the Pan Coordinator of the network. A message from a non-NC node, called a network device (ND), is typically directed to the NC. The NC, in turn, forwards the message to the destination ND.

In the PSR architecture, when a new node is powered up, it broadcasts a beacon request. A node that has already joined the network and is located within the radio range of the beaconing device, receives the beacon request. This member node has previously gone through a similar discovery cycle to join the network. As a result, it has learned its routing information to send and receive messages from the NC. Upon receiving the beacon request, it may choose to respond by sending its identity or address to the beaconing node. The new node collects beacon responses from one or more such willing member nodes. It stores the address along with a cost indicator for each of these neighbor member in its local routing table. The cost indicator represents the current link quality of the communication link between the new node and the corresponding neighbor member node. Note that this cost (i.e., the local link cost) is an indicator local to the communication between the pair of nodes only.

As shown in FIG. 1A, if a new member ND A wants to send a message to another member ND B, in PSR, this is accomplished by ND A sending an upstream message to the NC. Upon receiving the message, the NC forwards it to the requested destination ND B as a downstream message as shown in FIG. 1B.

To initiate sending the upstream message, ND A looks in its local routing table to select the neighbor with the minimum current local link cost. ND A first attempts to send the message to this minimum local link cost neighbor, say ND C. Upon receipt of this message, ND C (a relay node) follows a similar neighbor selection using its own routing table to forward the message to another ND. Before it does that, ND C adds its own address to the message as part of the routing specification. This process continues until the message reaches the NC. Along the way, each relay node adds its own address to the message routing specification.

The NC, upon receiving the message, extracts and saves the routing specification which is the route that the message from ND A followed to the NC. In other words, the NC stores the sequence of intermediate relay node addresses as the route for ND A. Anytime, the NC needs to send a downstream message to an ND, such as ND A, it will copy this previously learned route in reverse order of addresses as the downstream routing specification as shown in FIG. 1B. As the message traverses downstream towards ND A, each relay node will remove its own address from the routing specification. It also determines the next node that the message is to be relayed to from this specification.

The above routing scheme is simple to implement and works well for relatively small networks. Each node sends the message to a known neighbor based on a current local cost indicator. If the message fails to be delivered to the neighbor after a fair number of retrials, then the node selects the next minimum link cost local neighbor.

However, PSR is suboptimal in the sense that it follows the route that is deemed to be optimum locally. With this local approach, a message sometimes will take a globally suboptimal route, possibly taking a greater count of "hops" than is necessary. This has the potential to add extra delays and to decrease the probability of final message delivery. PSR also requires the routing specification to be incrementally added in upstream routing which limits the number of hops that a message can take to arrive at the NC. More significantly, it is required to send this routing specification which is purely routing overhead.

Using the PSR approach, since the NC receives and saves the complete routing specifications from each ND, it needs a relatively large memory for storing that data. Even worse, there is a relatively large amount of redundant information in the routing specification coming from the different NDs. Although this redundancy can be removed by intelligent software filtering, there is, nevertheless, an increased address overhead that provides an opportunity for improvement.

Accordingly, there is room for improvement in ad-hoc networks and methods for routing packets in such networks.

SUMMARY OF THE INVENTION

These needs and others are met by the present invention, which employs a graph framework for routing packets in an ad-hoc network, such as a wireless sensor network (WSN). The framework builds upon a robust and efficient proactive source routing (PSR) algorithm and, also, harnesses dynamic graph algorithms to globally optimize route selection based on available link costs of individual pairs of wireless nodes.

In accordance with one aspect of the invention, an ad-hoc network comprises: an ad-hoc network coordinator comprising: a first processor, a first memory, and a first communication interface; and a plurality of ad-hoc network devices, each of the ad-hoc network devices comprising: a second processor, a second memory, and a second communication interface structured to communicate with the first communication interface of the ad-hoc network coordinator or with the second communication interface of at least another one of the ad-hoc network devices, wherein the first processor cooperates with at least some of the ad-hoc network devices to globally optimize a route based on a plurality of link costs for: (i) pairs of the ad-hoc network devices, or (ii) pairs of the ad-hoc network devices and at least one pair including one of the ad-hoc network devices and the ad-hoc network coordinator, in order to minimize cost along the route that: (a) one of the ad-hoc network devices or the ad-hoc network coordinator employs to send a packet to: (b) another one of the ad-hoc network devices or the ad-hoc network coordinator.

The ad-hoc network devices may be structured to build and maintain a plurality of local graphs to manage packet routing locally for the corresponding one of the ad-hoc network devices; and the ad-hoc network coordinator may be structured to build and maintain a global graph to manage packet routing globally for the ad-hoc network.

The local graphs may comprise a set of vertices corresponding to some of the ad-hoc network devices, a set of edges connecting the vertices, and a set of link costs associated with the edges.

As another aspect of the invention, a method is for determining routing of packets of an ad-hoc network comprising an ad-hoc network coordinator and a plurality of ad-hoc network devices in which the ad-hoc network devices communicate with the ad-hoc network coordinator or with at least another one of the ad-hoc network devices. The method comprises: employing a plurality of link costs for: (i) pairs of the ad-hoc network devices, or (ii) pairs of the ad-hoc network devices and at least one pair including one of the ad-hoc network devices and the ad-hoc network coordinator; globally optimizing a route based on the link costs; and minimizing cost along the route that: (a) one of the ad-hoc network devices or the ad-hoc network coordinator employs to send a packet to: (b) another one of the ad-hoc network devices or the ad-hoc network coordinator.

BRIEF DESCRIPTION OF THE DRAWINGS

A full understanding of the invention can be gained from the following description of the preferred embodiments when read in conjunction with the accompanying drawings in which:

FIG. 4A is a diagram of a procedure Route Discovery Client.

FIG. 4B is a diagram of a procedure Neighbor Discovery.

FIG. 4C is a diagram of a procedure Neighbor Discovery Coordinate.

FIG. 4D is a diagram of a procedure Update Route.

FIG. 4E is a diagram of a procedure Route Discovery Service.

FIG. 4F is a diagram of a procedure Xmit Upstream.

FIG. 4G is a diagram of a procedure Process Upstream Msg.

FIG. 4H is a diagram of a procedure Xmit Downstream.

FIG. 4I is a diagram of a procedure Process Downstream Msg.

DESCRIPTION OF THE PREFERRED EMBODIMENTS

Figure 1A:
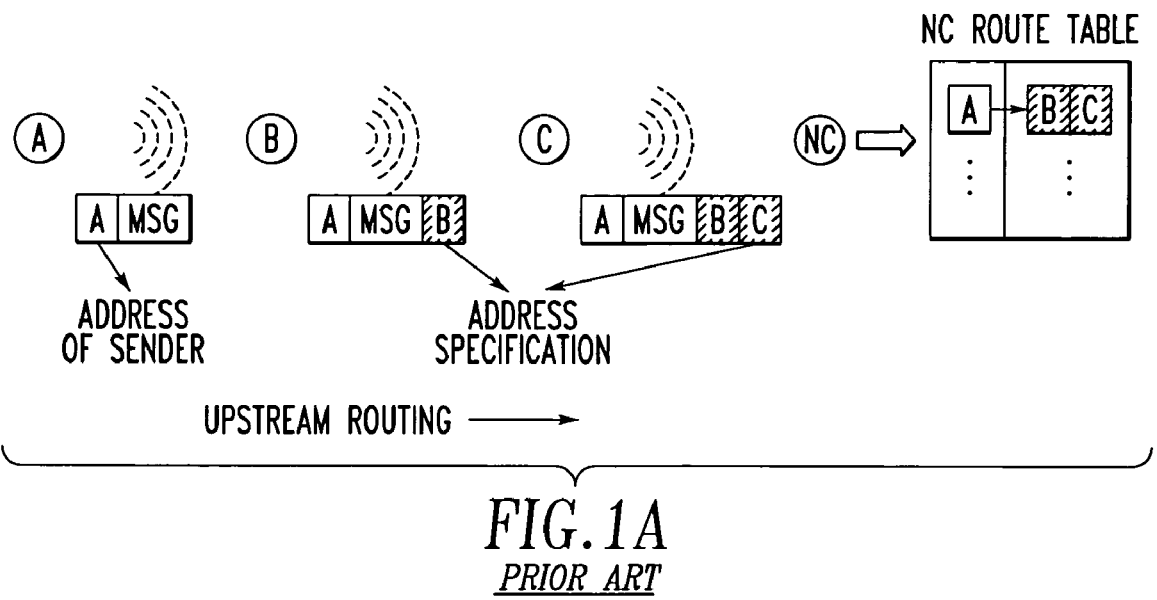
FIGS. 1A-1B are message diagrams of upstream and downstream routing for the PSR algorithm.
Figure 1B:
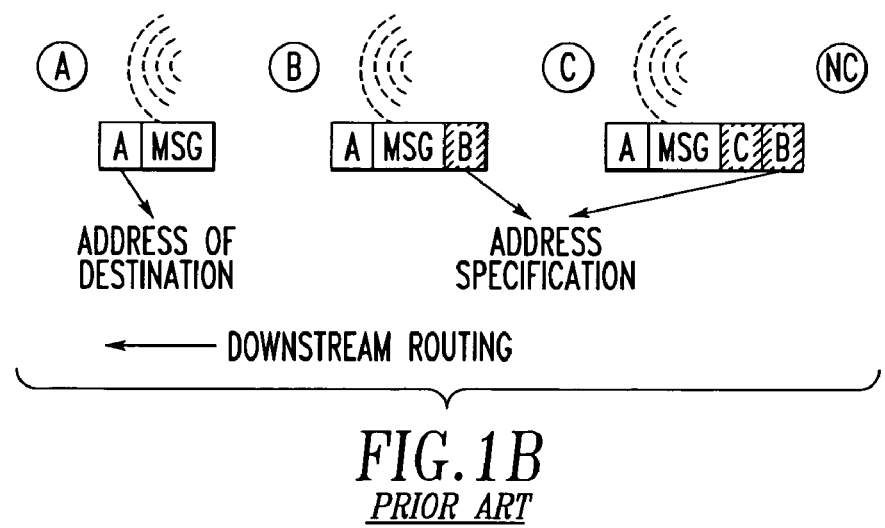

As employed herein, the term "wireless" shall expressly include, but not be limited by, radio frequency (RF), light, visible light, infrared, IrDA, ultrasound, wireless area networks, IEEE. 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein, the term "portable communicating device" shall expressly include, but not be limited to, any portable communicating device having a wireless communication port (e.g., a handheld device; a handheld personal computer (PC); a portable or laptop PC; a Personal Digital Assistant (PDA); a mobile or cellular telephone; a wireless Internet device; a protocol-enabled telephone; a portable wireless device).

As employed herein, the term "network coordinator" (NC) shall expressly include, but not be limited to, any communicating device, which operates as the central controller in an ad-hoc communication network.

As employed herein, the term "network device" (ND) shall expressly include, but not be limited to, any communicating device (e.g., a portable communicating device; a fixed communicating device, such as, for example, switches, motion sensors or temperature sensors as employed in a wirelessly enabled sensor network), which participates in an ad-hoc communication network, and which is not a central controller.

As employed herein, the term "node" includes NDs and NCs.

As employed herein, "centralized routing" is a routing system in which a central system is responsible for telling other nodes which routes to use.

As employed herein, a "graph" is a diagram or other representation consisting of a finite set of nodes and internode connections (i.e., edges), which can be used for representing network connections.

As employed herein, "localized routing" is a routing system in which each node decides on the basis of locally available information, which routes to use.

As employed herein, "loop free" is a routing algorithm property, which provides that a message routed in a network will either be delivered to its final destination or be discarded in a finite amount of time.

As employed herein, "connected network device" is a network device whose participation in an ad-hoc communication network was accepted by the network coordinator.

As employed herein, "network topology" is a definition of the logical arrangement and interconnection pattern of nodes in a communication network.

As employed herein, "routing" is the function of finding a suitable path for a message to take from one node to its final destination.

As employed herein, the term "mains-powered" refers to any ND, which has continuous power capabilities (e.g., powered from an AC outlet or AC receptacle or AC power source; AC/DC powered devices; rechargeable battery powered devices; other rechargeable devices), but excluding non-rechargeable battery powered devices.

The present invention is described in association with a wireless sensor network, although the invention is applicable to a wide range of ad-hoc networks.

The present WSN routing methodology (PSRg or "graph-based PSR", but not to be confused with "PSR") is based on graph theory. PSR is disclosed by U.S. Patent Application Publication No. 2004/0233855, which is incorporated by reference herein. The wireless nodes may be semi-mobile and may employ, for example, an IEEE 802.15.4 compliant radio or transceiver. In PSRg, each node manages the routing information in the form of a graph. When it changes, the routing graph is updated to the network coordinator (NC) node in the network. This NC merges all the local graphs to form and manage a global routing graph. By applying suitable graph algorithms, this NC node computes and specifies globally optimized routes to be followed by the network device (ND) nodes. In turn, the NC follows globally optimized routes to communicate with the ND nodes. By applying a formal analytical approach, the ND nodes do not need to use or accumulate routing specification in the message they transmit to the NC. This removes any maximum hop limitation for these messages and gains performance improvements over PSR.

The disclosed routing methodology combines the simplicity of PSR with the power of graph representation and analysis. This provides the following improvements: (1) given a set of nodes in the network and the associated link cost, cost is minimized along the route that node i selects to send a packet to another node j; (2) routing overhead is reduced; (3) the full potential of connectivity that exists in a network for routing robustness is exploited; and (4) the NC routing data is stored and processed more efficiently. These are accomplished by employing an efficient representation and analysis of the wireless link connectivity and routing information of nodes in a given mesh network. Graph data structures are employed by PSRg, while each ND node builds and maintains a graph to manage the routing locally, the NC node does the same to manage the routing globally. Each local graph is a smaller subset of the global graph.

The WSN routing information in the NC is represented as a graph G(V,E,C). The graph contains a set of vertices, V; a set of edges, E, connecting these vertices; and a set of link costs, C. All of the routing graphs are a function of time since vertices and edges are added and removed in real-time, reflecting the dynamics of the underlying WSN. For simplicity of disclosure, time is not mentioned in the notations of the graphs employed.

Each vertex $v \in V$ represents a node in the network. The assigned vertex numbers are unique for each node in the network and correspond to its address. The vertex v is also referred to as a member node in the network. In the WSN architecture, only one of these nodes is the NC. The vertex number for the NC is 0. Every other vertex v represents one of the NDs.

In the disclosed PSRg, when a new node joins the network, the NC allocates a new vertex v such that $V = V \cup \{v\}$, where, in this example, v is assigned the next available positive integer that has not been assigned to any existing $v' \in V$.

Each edge $e \in E$ is defined as an ordered pair of vertices. Formally, $e_{ij}=(i, j)$ where $i,j \in V$ and $i \neq j$. In other words, node i has a wireless link with node j and can send a message to it. Node j is called a neighbor of node i. This link is a directed one from node i to node j.

$C \in \mathbb{R}^+$ is a set of link costs associated with the edges. A mapping $c : E \rightarrow C$ computes the link cost $c(e_{ij})$ associated with edge $e_{ij}$. So, each edge $e \in E$ is assigned a link cost $c(e) \in C$, where C is a multiset and, hence, can have duplicate elements since two edges can have the same link cost.

Link cost is a quality measure of the reliability of the wireless communication link between two nodes. See, e.g., Hershberger, J., et al., "Vickrey prices and shortest paths: What is an edge worth?," Foundations of Computer Science, 2001, Proceedings. 42nd IEEE Symposium on, October 2001, pp. 252-59. This is a dynamic measure that depends on several factors such as, for example, wireless radio energy in the environment, and level of radio activity in the receiving node. Metal or concrete barriers can also significantly reduce the link quality. Computation of a suitable link cost is known. See, e.g., Draves, R., et al., "Comparison of routing metrics for static multi-hop wireless networks," Tech. Rep. MSR-TR-2004-18, Microsoft Research, 1999 (describing and comparing cost estimation techniques that indicate the wireless link quality in ad hoc networks).

The link cost is generally asymmetrical in nature. In other words, the link cost and, hence, the reliability of communication link when sending a message from a node i to another node j is not always the same as sending a message from node j to node i. As one example, for an ND trying to send a message to its neighbor NC, the chances that the message will arrive at the NC is lower than if the NC is to send a message to the ND. This is because the NC will handle more message traffic and, hence, be more prone to dropping or loosing packets. This is generally true between two neighboring nodes since there will be asymmetry of network traffic.

The NC does not compute the link costs. Each ND computes its link costs based on various relevant parameters available and sends those to the NC. Since, the NC does not have direct access to these parameters, it cannot compute the link costs.

The radio links between two nodes are not always perfectly symmetrical. However, arbitrarily considering all links (hence all graph edges) to be unidirectional is equivalent to ignoring existing redundant connectivity in a given network. This may result in suboptimal routing performance. On the other hand, by assuming unidirectionality of the edges, one can be less concerned about potential loops in the routing scheme. See, e.g., Mosko, M., et al., "Loop-free routing using a dense label set in wireless networks," Proceedings of the 24th International Conference on Distributed Computing Systems (ICDCS04), IEEE Computer Society, 2004; Prakash, R., "Unidirectional links prove costly in wireless ad-hoc networks," Seattle, August 1999, 3rd International-Workshop on Discrete Algorithms and Methods for Mobile Computing and Communications; and Vanitchanant, N., et al., "Unidirectionality in ad-hoc networks: a simulation study," MILCOM: Military Communications Conference, October 2003, vol. 2, IEEE. As a result of this property, the NC routing graph G maintains directional edges $e_{ij}$ and $e_{ji}$ between two nodes i and j.

Figure 2A:
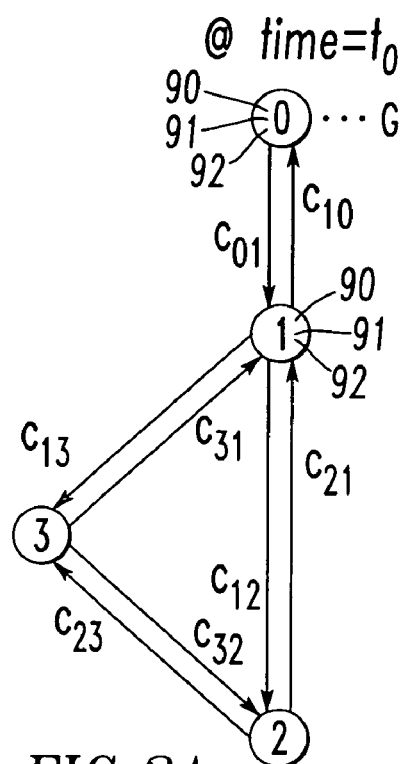
FIG. 2A is a routing graph showing a state before route discovery initiated by a new node, in which a global graph is at the network coordinator (NC), node 0, in accordance with the present invention.
Figure 2B:
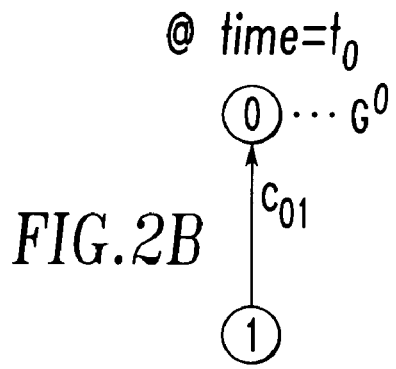
FIGS. 2B-2E are routing graphs showing local graphs of the nodes 0 through 3, respectively.
Figure 2C:
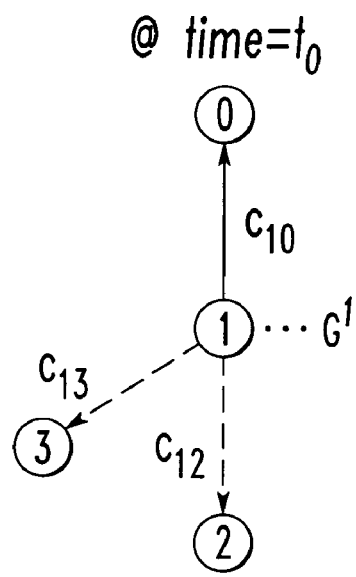

FIGS. 2A-2E show the routing graphs for a specific mesh network at a snapshot of time to. Each of the nodes 0, 1, 2, 3, as shown with nodes 0 and 1, includes a processor 90, a memory 91 and a suitable communication interface 92. An edge connecting an upstream neighbor is drawn in solid line in the local graphs, while a downstream neighbor is connected as a dotted line edge. As discussed, node 0 is the NC and nodes 1, 2 and 3 are the NDs. FIG. 2A shows an example NC routing graph G. The link costs are shown adjacent to each edge. For example, the link cost $c(e_{21})$ associated with the edge from node 2 to node 1 is shown as cost $c_{21}$.

The following example sends a message from a source node $s \in V$ and a destination node $d \in V$ in a given wireless sensor network represented by its global routing graph G(V, E,C). Since the route is between two different nodes, $s \neq d$, the message from node s will take route, $r_{sd}$ to reach node d. Route $r_{sd}$ is described as an ordered set of all intermediate nodes that the message can possibly take. Formally, this is shown by Equation 1:

$$r_{sd} = \{r_{sd}(1), r_{sd}(2), \ldots, r_{sd}(n-1), r_{sd}(n) = d\} \quad \text{(Eq. 1)}$$

wherein:

n is an integer.

Route $r_{sd}$ also includes the destination node d as the last element in the ordered set. All intermediate nodes in a route specification are member nodes in the graph G, i.e., $r_{sd} \subset V$. This is a subset since at least one member node, s, is not included in the route specification.

In a mesh network, the term "hop" is sometimes used to describe an intermediate node that a message is relayed through. The number of hops in a route r is, therefore, |r|. If $r_{sd} = \{d\}$, then the message can be transmitted directly to the destination node d without using any intermediate node. Hereinbelow, for simplicity of disclosure when the context is clear, only route r is employed and the source and destination nodes for which they are specified are eliminated.

A route $r \neq \emptyset$ between a source node s and a destination node d is continuous if Equation 2 holds:

$$r = \begin{cases} \{d\}: d = r(1) \wedge e_{sd} \in E & \text{if } |r| = 1, \\ \{r(i)\}: e_{r(i),r(i+1)} \in E, \forall\, 1 < i < |r| & \text{else.} \end{cases} \quad \text{(Eq. 2)}$$

wherein:

i is an integer.

The route is continuous if in graph G, there is an edge from the source node to the destination node. The route r is also continuous if starting at the source node and following directional edges to reach the destination node traverse each intermediate node successively.

Preferably, to avoid routing loops ("live lock") and to improve routing efficiency, loops are not employed in the route. In order to avoid loops, all valid routes satisfy the following property: a route r between a source node and a destination node is loop-free if each node in the route appears only once in the route. Formally, it is loop-free if $\nexists r(i), r(j) \in r$: $r(i) = r(j), \forall\, 1 < i, j \leq |r|$, wherein i and j are integers.

A route r is valid if it is continuous and loop-free. For example, in FIG. 2A, a valid route between node i=2 to j=0, $r_{ij}$ is $\{3, 1, 0\}$.

The route cost of a valid route r is the sum of all the local link costs along the route. Formally, route cost is shown by Equation 3.

$$C(r) = \sum_{i=1}^{|r|-1} c(e_{r(i),r(i+1)}) \quad \text{(Eq. 3)}$$

The set $R_{sd}$ is the set of all valid routes from a pair formed by a source node s to a destination node d. There exists a route from node s to node d if $R_{sd} \neq \{\emptyset\}$. For example, in FIG. 2A, $R(2,0) = \{\{1,0\}, \{3,1,0\}\}$. Given a valid route specified in Equation 1, the reverse of $r_{sd}$ is denoted by $\bar{r}_{sd}$ as shown in Equation 4.

$$\bar{r}_{sd} = \{r_{sd}(n-1), r_{sd}(n-2), \ldots, r_{sd}(1), s\} \quad \text{(Eq. 4)}$$

This is obtained by reversing the order of nodes in route $r_{sd}$ and replacing the destination node d in place of the source node s. In the previous example for $\bar{r}_{2,0}=\{3, 1, 0\}$, $r_{2,0}=\{1, 3, 2\}$.

The property $r_{sd} \in R_{sd} \not\Rightarrow \bar{r}_{sd} \in R_{ds}$ states, in general, that a valid route from node s to node d, does not imply the validity of the corresponding reverse route from node d to node s. This follows directly from the link cost asymmetry property. If route $r_{sd}=\emptyset$, then there does not exist a route between the two given nodes.

The NC builds and maintains a graph G to manage the routing in the network. Each node in the network manages local routing information by maintaining a graph as well. A local graph for node i∈V is represented as $G^i$ ($V^i, E^i, C^i$) where $V^i \subseteq V$ and $E^i \subseteq E$. The NC knows its own local graph $G^0$ in addition to the global graph G. Formally, $V^i=\{j: e_{ij} \in E\} \cup \{i\}$ and $E^i=\{e_{ij} \in E: \forall j \in V^i\}$.

Similar to the NC global routing graph, each ND also maintains the local link costs in a multiset $C^i$. Unlike the NC, however, the ND i can compute link costs corresponding to its local routing graph edges. This is possible, since all the relevant parameters for computing this cost are only available to the local node. Consequently, a local link cost computing function is $fLC^i: (V^i-\{i\}) \to \mathbb{R}^+$. Node i can compute the link cost to another node in its local routing graph by applying this function. Since, in this graph framework, there are no "self edges", the node does not need to compute the link cost to itself. This function may be suitably tuned for an individual ND. For example, the link cost function for a battery operated ND will be different from that of a "mains-powered" ND. Analogous to the global cost map c for a global routing graph, the local cost map $c^i$ is $E^i \to C^i$.

FIGS. 2B, 2C, 2D and 2E represent the local routing graphs for nodes 0, 1, 2 and 3, respectively.

The property $\forall i, \nexists j \in V^i: (e_{ji} \in E^i)$ states that a local graph $G^i$ for any node i shall have only outgoing edges from i. The set of nodes $V_{us}^i \subset V^i$ is called the upstream nodes with respect to the node i if $\forall j \neq 0 \in V_{us}^i$ satisfy the following conditions: (1) $j \notin (V^i \cup \{0\}) - \{i\}$; (2) $\exists r \in R_{j,0} \land i \notin r \land j \neq 0$; and (3) $i \notin V_{us}^j$. The first condition provides that an upstream neighbor is a node in the local graph for i. Node 0 in this local graph is always an upstream node for i. Node i cannot be its own upstream neighbor. The second condition states that there exists a valid route from node j to the NC without going through node i. Finally, the last condition forbids node i from being an upstream neighbor in the local graph for j.

The property $V_{us}^0 = \emptyset$ states that the NC cannot have any upstream neighbor(s). This is true since the NC (node 0) is the first node to establish the network. In other words, no other member node can join this network before the NC does.

The subset $V_{ds}^i$ is the set of downstream nodes. Formally, $V_{ds}^i = V^i - V_{us}^i - \{i\}$.

Figure 2D:
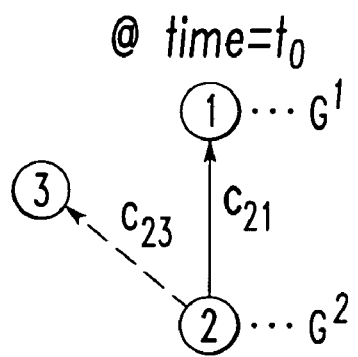
Figure 2E:
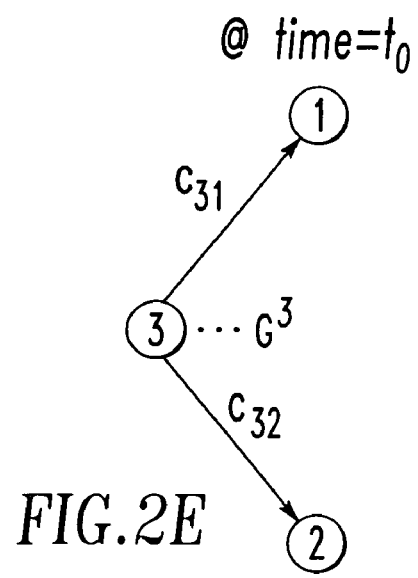

The property $V^i = \{i\} \cup V_{us}^i \cup V_{ds}^i$ states that every node other than the node itself in a local graph is either an upstream or a downstream node. This follows directly from the definitions of upstream and downstream neighbors. In FIG. 2D, local graph $G^2$ has node 1 as an upstream neighbor of node 2. Correspondingly, in local graph $G^1$, FIG. 2C, node 2 is a downstream neighbor of node 1.

The property $V_{us}^i \cap V_{ds}^i = \emptyset$ states that any neighbor node can be either an upstream or a downstream node, but not both.

A node i is called a leaf node, if $V_{ds}^i = \emptyset$. In other words, a leaf node does not have any downstream neighbors. Membership in the graph framework is defined by a node i being a member of the network if i=0 or i ∈ V and $V_{us}^i = \emptyset$. In other words, the NC is always a member of the network (since it starts the network formation). Any other node can only be a member of the network if it has at least one upstream neighbor. Membership reflects connectivity of the node in the network. In a mesh network, each new node should find a way to send messages to the NC. Upstream connectivity of a node gives it the ability to reach the NC eventually, either directly (with one hop) or indirectly (with multiple hops).

A node i is said to be isolated if i∈V and $V_{us}^i = \emptyset$. The difference between a member node and an isolated node is that in the latter case, the node is known to the network, but it does not have any upstream neighbor to communicate to the NC. If a node has only downstream neighbors, then it cannot be said that there is a valid route from that node to the NC.

Given all the neighbors of a node, the node will prefer to communicate first with the neighbor that has the minimum link cost. A locally minimum cost neighbor (LMCN) is the neighbor out of all the known neighbors of a node that has the minimum link cost. Of interest is either the upstream LMCN or downstream LMCN for a given node since the node will often need to send such directional messages. Two functions $fLMCN_{us}: V \to V$ and $fLMCN_{ds}: V \to V$ give the LMCN for a given node i for upstream and downstream directions as shown by Equations 5 and 6, respectively:

$$fLMCN_{us}(i) = \begin{cases} \emptyset & \text{if } V_{us}^i = \emptyset, \\ j: c^i(e_{ij}) \leq c^i(e_{ik}), \forall k \in v_{us}^i & \text{else.} \end{cases} \quad (Eq.\ 5)$$

$$fLMCN_{ds}(i) = \begin{cases} \emptyset & \text{if } V_{ds}^i = \emptyset, \\ j: c^i(e_{ij}) \leq c^i(e_{ik}), \forall k \in v_{ds}^i & \text{else.} \end{cases} \quad (Eq.\ 6)$$

The terms $lmcn_i^{us}$ and $lmcn_i^{ds}$ denote the output of $fLMCN_{us}(i)$ and $fLMCN_{ds}(i)$, respectively.

For any two graphs $G^i$ and $G^j$, two corresponding used operations are shown by Equations 7 and 8. The union operation is defined as follows:

$$G^i \cup G^j = G^k: V^k = V^i \cup V^j, E^k = E^i \cup E^j, C^k = C^i \cup C^j \quad (Eq.\ 7)$$

Graph union combines the nodes and edges of two input graphs into one output graph. Similarly, the minus operator is defined as follows:

$$G^i - G^j = G^k: E^k = E^i - E^j, C^k = C^i - C^j \quad (Eq.\ 8)$$

Two very important properties tie the local routing graphs to the global graph in the NC. These include strong and weak graph synchronization. For strong graph synchronization, the network is called strongly synchronized if Equation 9 is true:

$$G = \bigcup_{i=0}^{|V|} G^i \quad (Eq.\ 9)$$

Equation 9 provides that the network is perfectly synchronized if the routing graph at the NC is merely the union of all the local graphs at each member node. If this property holds true, then the NC has the knowledge of most current neighbor connectivity information of every member ND. A network should preferably strive to meet this state. However, trying to maintain strong synchronization under dynamic conditions when local connectivity information changes too fast or too often will result in poor routing performance.

For weak graph synchronization, the network is called weakly synchronized if Equation 10 is true:

$$\left(V = \bigcup_{i=0}^{|V|} V^i\right) \bigwedge \left(E = \bigcup_{i=0}^{|V|} E^i\right) \bigwedge \left(C \neq \bigcup_{i=0}^{|V|} C^i\right) \quad \text{(Eq. 10)}$$

With weak synchronization, the global graph in the NC is equal to the union of all the local graphs at the ND (which is strong synchronization) except that the costs for some edges in the global graph are not equal to the costs for the counterpart edges in the local graph. In other words, the NC has the complete knowledge of the connectivity information of every member ND without perfect knowledge of link costs.

The network routing performance should improve by maintaining weak synchronization a majority of the time and choosing to attain strong synchronization only intermittently or infrequently. A network is not synchronized if it is neither strongly nor weakly synchronized. Any routing scheme should completely avoid or at least minimize the chances of the network attaining this form of synchronization. If this happens, message loss will increase in the system. Increasing routing delay is another potential observable consequence.

Equations 11-16, below, cover optimizing the routing in a given wireless sensor network. For a given pair of source and destination nodes, i, j, there exists a globally minimum cost route (GMCR). This GMCR is simply the route choice among all the possible routes available for the pair that has the minimum overall route cost. Note that the GMCR uses the minimum cost over the entire route, not just over one link. A function $f\text{GMCR}: V \times V \rightarrow \mathbb{R}^+$ gives the GMCR for any given pair of source and destination node as shown in Equation 11:

$$f\text{GMCR}(i, j) = \quad \text{(Eq. 11)}$$
$$\begin{cases} \emptyset & \text{if } R_{ij} = \emptyset, \\ r_{ij} \in R_{ij} \mid \forall r'_{rj} \in R_{ij} \leq C(r_{ij}) \leq C(r'_{ij}) & \text{else.} \end{cases}$$

For any route $r_{ij}$, GMCR is $r_{ij}^{gmc}$, the return value of $f\text{GMCR}(ij)$. Due to the link cost asymmetry property, in general, $r_{ij}^{gmc} \neq r_{ji}^{gmc}$.

For any given pair of source and destination nodes i, j, the very first element in $r_{ij}^{gmc}$ is called the global minimum cost neighbor (GMCN). Accordingly, a function $f\text{GMCN}: V \times V \rightarrow V$ returns this neighbor $gmcn_{ij}$ as shown in Equation 12:

$$f\text{GMCN}(i, j) = \begin{cases} \emptyset & \text{if } R_{ij}^{gmc} = \emptyset, \\ r_{ij}^{gmc}(1) & \text{else.} \end{cases} \quad \text{(Eq. 12)}$$

There are three properties for any non-empty GMCR (i.e., $f\text{GMCR}(i, j) \neq \emptyset$). First, $f\text{GMCR}(i, j) = f\text{GMCR}(i, k) \cup f\text{GMCR}(i, k) \forall i,j \in V, k \in r_{ij}^{gmc}$. In other words, a GMCR consists of many sub-GMCRs. Any sub-route of a GMCR is also a GMCR.

The other two properties are important in defining an efficient upstream routing procedure. The second property, $f\text{GMCN}(f\text{GMCN}(f\text{GMCN}(i, j), j), j) \ldots j \forall i, j \in V, i \neq j$, states that a destination node can be traced by successively finding global minimum cost neighbors. This can be derived using the first property. The third property, $f\text{GMCR}(i, j) = \{f\text{GMCN}(i, j), f\text{GMCN}(f\text{GMCN}(i, j), j), \ldots, j\} \forall i, j \in V, i \neq j$, states that the complete global minimum cost route can be traced using successive global minimum cost neighbors terminating at the destination node j. This can be derived using the first two properties.

Two messaging scenarios are important in the disclosed PSRg architecture. The first one is when different NDs have to send upstream messages to a single destination which is the NC in the network. The second one is when the NC has to send a message to each ND. In this case, all downstream messages have a single source (the NC) but different intended destinations (NDs). In order to handle these two scenarios, additional functions are shown in Equations 13-16. Equation 13 is called single source minimum cost route function $f\text{SSMCR}$. For any source node i, $f\text{SSMCR}$ computes the GMCR from each node i to $j \neq i$.

$$f\text{SSMCR}(i) = \{r_{ij}^{gmc}: \forall j \in V, j \neq i\} \quad \text{(Eq. 13)}$$

$f\text{SSMCR}(i)$ then returns a set of routes represented as $\text{SSMCR}^i$.

For this given source node i, a function $f\text{SSMCN}(i)$ collects the GMCNs corresponding to each GMCR computed by $f\text{SSMCR}(i)$. The function of Equation 14 returns a set $\text{SSMCN}^i$ containing all the single source minimum cost neighbors for source node i.

$$f\text{SSMCN}^i = \{gmcn_{ij}: \forall j \in V, j \neq i\} \quad \text{(Eq. 14)}$$

A single destination minimum cost route function $f\text{SDMCR}$ is shown in Equation 15. For any destination node i, $f\text{SDMCR}$ computes the GMCR from each node $j \neq i$ to i.

$$f\text{SDMCR}(i) = \{r_{ji}^{gmc}: \forall j \in V, j \neq i\} \quad \text{(Eq. 15)}$$

Analogously, for this given destination node i, a function $f\text{SDMCN}(i)$ of Equation 16 collects the GMCNs corresponding to each GMCR computed by $f\text{SDMCR}(i)$. The function returns a set $\text{SDMCN}^i$ containing all the single destination minimum cost neighbors for destination node i.

$$f\text{SDMCN}^i = \{gmcn_{ji}: \forall j \in V, j \neq i\} \quad \text{(Eq. 16)}$$

The disclosed PSRg architecture has four main functions: (1) route discovery; (2) upstream routing; (3) downstream routing; and (4) route recovery. Route recovery is the process of recovering from any error condition that may happen during the routing of a packet. This can happen during either downstream or upstream routing. For example, if an intermediate node is non-operational, then the packet cannot be routed further after being sent to this node. Hence, the error is detected and a remedial action is taken by the sending node.

For route discovery, the approach is to proactively determine the routes unlike on-demand routing schemes. A set of procedures describe the computational steps that each participant node performs. To explain the set of procedures that describe the route discovery protocol, a network state at time $t_0$ is depicted in FIGS. 2A-2E. In this state, the network has already formed with the NC (node 0) and three other member NDs (nodes 1, 2 and 3). FIG. 2A shows the current state of the global routing graph, G, and FIGS. 2B through 2E show the local routing graphs $G^0$ through $G^3$ for nodes 0 through 3, respectively.

Figure 3:
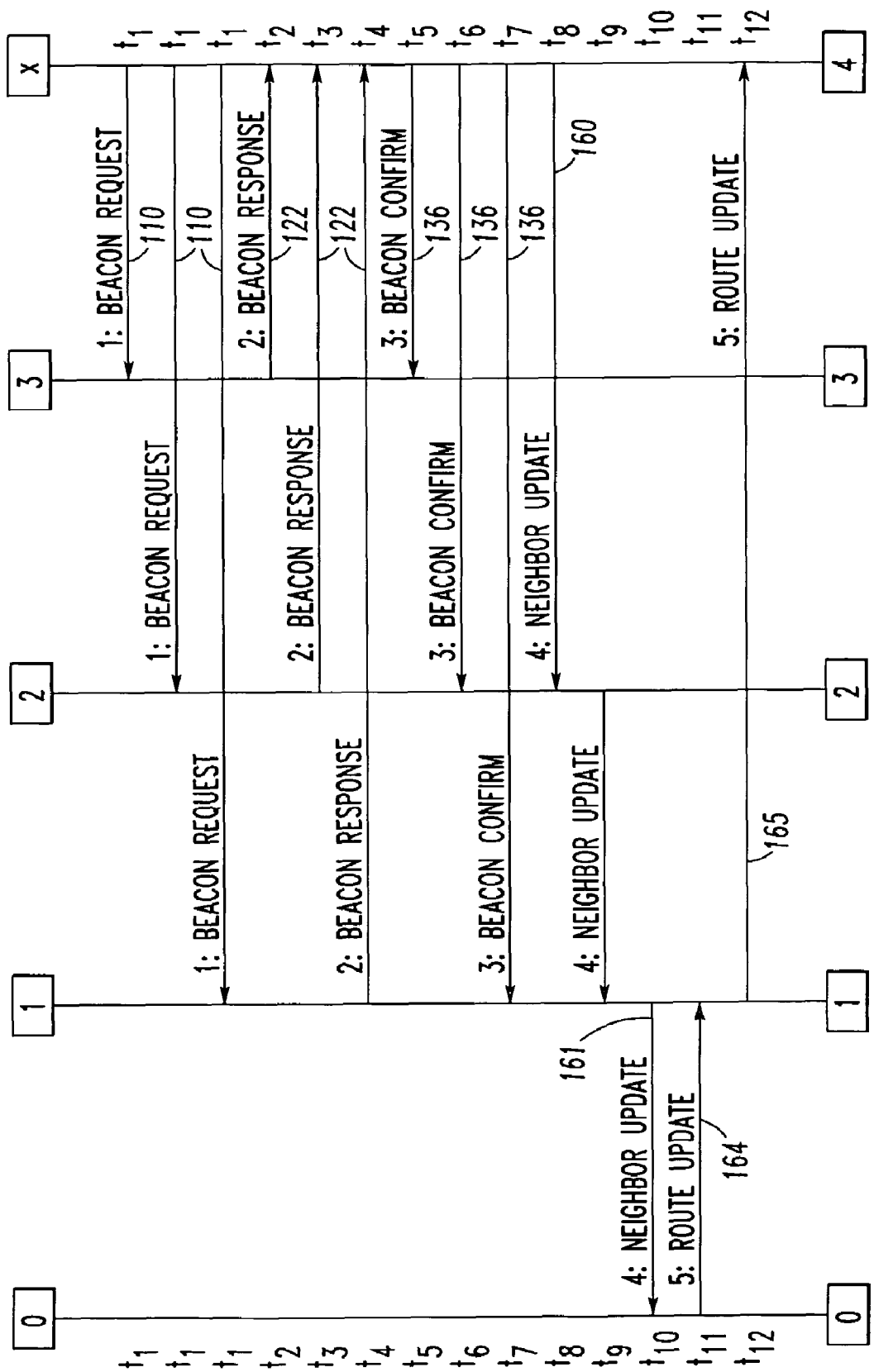
FIG. 3 is a message sequence diagram showing messages exchanged during route discovery in accordance with the present invention.

Initially, for example, a new node is powered up inside the radio range of the nodes of the existing network. The new node goes through route discovery steps with participation from other member nodes. An example set of message interchanges and the sequence of these messages are shown in FIG. 3. There, the member nodes are marked with their respective short address, equivalently the corresponding vertex number in the local and global graph representations. The new node is marked as x, since it only obtains its short address during the route discovery phase from the NC as was described above. Address allocation is obtained during the very first time a new node performs route discovery. If the new node is reset and restarted again to join the same network as before, then it retains the short address previously allocated.

In the following nine procedures of FIGS. 4A-4I, wireless messages (e.g., Beacon Request; Beacon Response; Beacon Confirm; Neighbor Update; Route Update) are shown in FIG. 3 and the data carried in the messages are represented as parameters to the messages. The symbol "⇒" is employed before a message name which represents that the node running the procedure is the sender of the message. Similarly, the symbol "⇐" is employed to represent that the node is the receiver of the message. To distinguish between unicast and broadcast, all broadcast messages are represented as ⇛ (node is the sender) or as ⇚ (node is the receiver). A superscript with these arrows is the address of the immediate neighbor to which the message is being sent to (⇒$^j$) or the message is being received from (⇐$^j$).

FIG. 4A shows the procedure Route Discovery Client 100. A node (ND) executes the Route Discovery Client procedure 100 when it is powered up or reset or when the node is isolated from the network. This procedure 100 is not used by the NC (i=0) since the NC establishes the network that another node (ND) wants to join as a member thereof. This procedure 100 first calls procedure Neighbor Discovery 102 of FIG. 4B to learn about its member neighbors. It then uses procedure Update Route 104 of FIG. 4D to update the NC of the network about its newly learned neighbors and, in turn, receives recommendations about which neighbor to use for sending upstream messages that will yield maximum routing efficiency or minimum routing cost.

FIG. 4B shows the procedure Neighbor Discovery 102. In step 106 of the procedure Neighbor Discovery 102, the node i erases its existing local routing graph since, in this procedure, it will rebuild this graph from scratch. In step 108, the node broadcasts a Beacon_Request message 110. This message 110 is equivalent to a "hello" message from this node for other neighboring member nodes. In FIG. 3, this message 110 is marked as 1. In this scenario, the nodes 1, 2 and 3 receive this message 110 since these nodes are the only ones, in this example, within the radio range of the new node x. This broadcast message 110 is shown as three different messages from node x to each of nodes 1, 2 and 3 all originating at the same time $t_1$.

Nodes 1, 2 and 3 have already gone through the discovery process to become a member of the network hosted by the NC, node 0. Each such member node also executes the procedure Neighbor Discovery Coordinate 112 of FIG. 4C.

In this procedure 112 of FIG. 4C, in step 114, only the member nodes execute this process. In steps 116 and 118, whenever the node receives a Beacon_Request message 110, it sends out a Beacon_Response message 122. This response message has to be broadcast, since the request message does not carry any information about the sender node identity. In step 118, this response message carries the link cost $c_{ij}$ 120 as computed by the node i to the node j from which it just received the request message.

In FIG. 3, node x receives a set of such Beacon_Response broadcasts (message 2) 122 from its member neighbors at times $t_2$, $t_3$, and $t_4$. Referring to the Neighbor Discovery procedure 102 of FIG. 4B, in even steps 124 through 134, the new node x waits for a fixed duration for the Beacon_Response message 122 from a member node j. In step 126 of this procedure 102, the new node x receives the link cost $c_{ji}$ 127 sent by node j and computes its own link cost $c_{ij}$ 137 to node j, using its link cost function $fLC^i$. Upon receipt of each such message 122, the new node x adds (in step 128) the member node j as another upstream vertex in its local graph $G^i$. Also, in step 130, the new node x adds an edge from i (itself) to j. With this, this node i now knows that its member node j is an upstream neighbor and can be used to send a wireless message upstream (closer to the NC). In step 132, the new node x adds the newly computed link cost to $C^i$. Lastly, in step 134, the new node x sends a Beacon_Confirm message 136 to node j indicating that it accepted and recorded node j as its downstream neighbor. These steps repeat for each such member node j that responded to the earlier Beacon_Request. Following this procedure, in FIG. 3, the node x sends this message 136 to nodes 1, 2 and 3 at times $t_7$, $t_6$ and $t_5$, respectively.

On the other side, the member neighbor is waiting to receive any Beacon_Confirm message 136 in step 138 of the Neighbor Discovery Coordinate procedure 112 of FIG. 4C. When it receives this message f step 140), it adds the node as its downstream neighbor (in step 142). It then adds an edge from itself to the new node (step 144) and the previously computed corresponding link cost (step 146) in its local graph.

Figure 5A:
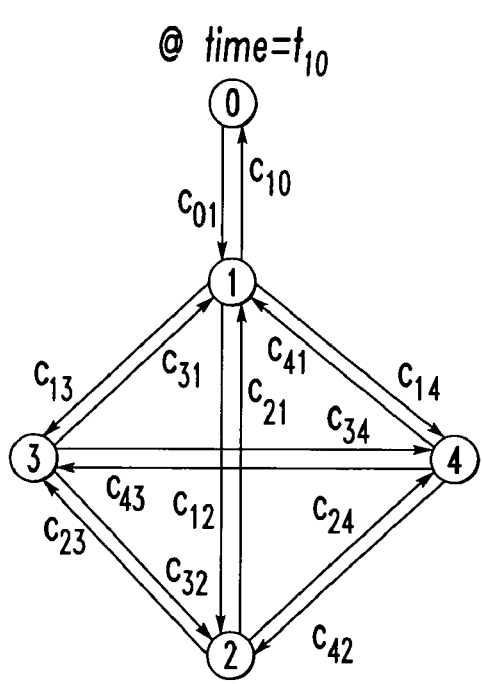
FIG. 5A is a routing graph after route discovery initiated by a new node 4, in which the global graph is at the NC in accordance with the present invention.
Figure 5B:
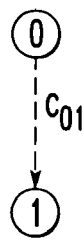
FIGS. 5B-5F are local graphs of nodes 0 through node 4, respectively.
Figure 5C:
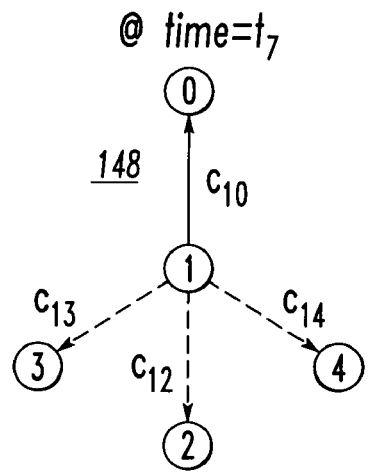
Figure 5D:
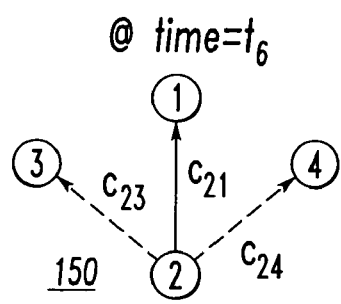
Figure 5E:
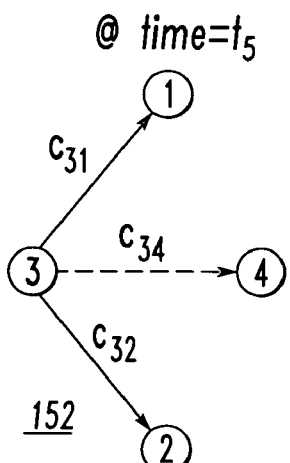
Figure 5F:
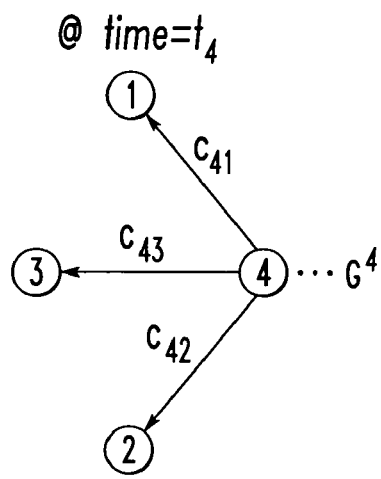

Referring to FIGS. 5C-5E with reference to the local graph edges of FIGS. 2A-2E, the graphs 148, 150, 152 in FIGS. 5C, 5D and 5E have added the new node x (node 4) as a downstream neighbor and the corresponding edges. Node 4 has built its local graph $G^4$ in FIG. 5F with three upstream neighbor nodes (1, 2 and 3 ) with the corresponding edges as well.

FIG. 4D shows procedure Update Route 104. After the neighbor discovery is complete, the new node 4 executes the Update Route procedure 104 of FIG. 4D to update the NC with its new found neighbor connectivity data. The NC never executes this procedure 104 since it does not go through the neighbor discovery process. In step 154, the new node i≠0, erases its any known gmcn from a previous route discovery attempt. It then, in step 156, selects its upstream LMCN, node j from the just built local graph $G^i$. In step 158, it sends a Neighbor_Update message 160 to node j (message 160 at time $t_8$ in FIG. 3, j=2). This message 160 carries the local graph $G^i$ as data. The node i then waits in step 162 for a pre-specified time to receive a Route_Update message 164 to be initiated by the NC.

If the local neighbor which receives the Neighbor_Update message 160 is not the NC (which is the case in FIG. 3), that node uses its upstream routing procedure (as is discussed below in connection with FIGS. 4F and 4G) to send the packet to the NC. This may take more than one hop as shown in FIG. 3 where the message 160 is first sent to node 2 at $t_8$, then to node 1 at $t_9$ and finally to the NC at $t_{10}$.

FIG. 4E shows the Route Discovery Service procedure 166. The message is processed in FIG. 4E when the NC receives it. Only the NC in the network provides this service. When a node establishes itself in the role of the NC in the network, it initializes this procedure 166 in even steps 168 through 174 and then waits in an infinite loop starting at 176 for Neighbor_Update messages, such as 161. In step 170 of initialization, it starts with an empty global routing graph G and then adds only one vertex 0 to the graph. This vertex represents the NC itself since it has already become a de facto member. In step 172, the NC initializes a set of current GMCRs with it being the source. This SSMCR set is employed for sending messages downstream. In step 174, the NC maintains two sets of SDMCN for destination as 0 (i.e., the NC itself as destination, relevant for upstream routing). SDMCN maintains the set of current GMCNs and SSMCN to maintain a set of previous GMCNs.

When it receives a Neighbor_Update message 161 originated at a client node i, the NC first removes all the existing edges to and from node i in graph G. This is accomplished in step 178 using the graph minus operator of Equation 8. If the client node i is attempting to join the network for the first time, then there will be no existing edges and, hence, no connectivity information for the node in G. In step 180, using the graph union operation of Equation 7, the newly arrived edges or connectivity information is added to graph G. Hence, essentially, in these two steps, the past connectivity information is replaced with the new one received from the client node.

In step 182, the existing SDMCN node information is saved for use later in step 190 of the procedure 166. In step 184, SDMCN is recomputed as per Equation 16 with the NC as the destination. In step 186, the downstream GMCR information is updated using Equation 13. In even steps 188 through 196, the NC determines the nodes for which gmcn for upstream routing to destination 0 has changed from the previous updates. The NC then sends a Route_Update message 164 (FIG. 3) to each such node with the respective new gmcn (in step 192). Even though the NC receives a Neighbor_Update message 161 from a single route discovery client node, multiple nodes may receive a Route_Update message 164 from the NC as a result of the new connectivity information from the client node. The NC has to send a Route_Update message 164 to the route discovery client node since it is waiting for this in step 198 of UpdateRoute procedure 104 (FIG. 4D). The NC employs the just computed SSMCR to specify the route for sending the Route_Update downstream message 164 to the discovery client node. It follows the procedure 200 of FIG. 4H for this purpose. As an example, in FIG. 3, although message 160 followed node 2 to node 1 to the NC on its route from node 4, message 165 at time $t_{12}$ follows node 1 to node 4 directly. With the help of the new connectivity information from node 4, the NC found the latter route to be the globally minimum cost route for downstream routing to node 4.

The route discovery client node is waiting for a Route_Update message 165 in step 162 of the Update Route procedure 104 (FIG. 4D). When it arrives, in step 198, the node updates its gmcn address. The node employs this address as the preferred neighbor for all upstream messages meant for the NC. In step 202, the NC ascertains that this gmcn is indeed one of its known neighbors with which it has established a radio link.

With this, the node 4 is ready for regular upstream and downstream function that will be discussed next.

In PSR parlance, a message follows upstream routing if the NC is the final destination. PSRg adopts a very simple and efficient upstream routing mechanism. Once each node joins the network after the routing discovery process, it knows its gmcn for sending messages to the NC. A node always forwards the message to its gmcn. As soon as the next node receives the message and recognizes that it is an upstream message, it, in turn, forwards the same to its gmcn. There is no other route information that goes with the message. As per the second property, as was discussed above, following the GMCN successively, the message can arrive at the destination 0. The third property, discussed above, asserts that this route is indeed the globally minimum cost route and, hence, the most efficient route available. In this approach, the upstream message can be delivered to the NC irrespective of the number of hops it has to go through. Each additional hop adds extra latency to the message delivery.

FIG. 4F shows procedure Xmit Upstream 204. This procedure 204 outlines the algorithmic step that any node follows to transmit a message upstream. The NC never uses this procedure 204 since it is the final destination of all such messages. The same procedure 204 is used for sending upstream messages from a source node as well as relaying of upstream messages from intermediate nodes. The only step 206 in the procedure 204 sends the upstream message $Msg_{us}$ with the given payload pl to its gmcn. Each upstream message carries the source node s that originated this message. The NC needs to know this address so that it can send a confirmation message to source node s upon receipt of $Msg_{us}$. Each upstream message carries a unique message identifier mid which is used by the source nodes to associate a confirmation from the NC to a specific message.

FIG. 4G shows procedure Process Upstream Msg 208. A node i uses this procedure 208 when it receives an upstream message sent by another node using the procedure 204 of FIG. 4F. The NC has to process upstream messages differently since it is the final destination or the sink of all such messages. The NC uses step 210 of this procedure, first to send a confirmation to the source node s. This confirmation message is a downstream message and is sent using the procedure 200 of FIG. 4H, as will be discussed. Then, in step 212, it suitably processes the upstream message. This ends the life of this upstream message. On the contrary, an intermediate node uses step 214 of the procedure 208 to simply forward the message to its gmcn using the procedure 204 of FIG. 4F.

In upstream routing, the final destination (the NC) is always known to the nodes. Accordingly, the NC can provide them with the corresponding gmcn to which they will forward the message. In the case of downstream routing, the final destination will not be a fixed node. It can be any node other than the NC. Theoretically, it is possible for the NC to update a node with the set of gmcn for each possible destination (i.e., all other nodes). With this information, the node will look at the destination of the message and will find the corresponding gmcn, very much like the upstream routing. The downstream message will not carry along any routing specification. Hence, there will be no limit on how many hops the message routes through. A node will process the message if it is the final destination. However, this approach requires a lot of routing update overhead and is not preferred for a large scale network. Hence, a slightly modified approach can also be considered to alleviate this routing update overhead problem. In a typical wireless sensor network application, there is only selective communication among the nodes. It is rare that all nodes need to communicate with all other nodes. Hence, instead of the NC updating the gmcn value for all other nodes in the network, it can update the nodes with the gmcn values for a particular downstream destination on demand. In other words, the NC establishes a route to a downstream destination when it needs to send a message for the first time. Once the route is established, each intermediate node remembers the corresponding gmcn for the destination for future use. Consequently, the downstream routing is similar to the upstream routing, yet with less routing overhead.

The above approach can further be improved by observing the implications of the three properties. In order to compute $SSMCR^0$ in the procedure 166 of FIG. 4E, the shortest path tree (SPT) is computed for graph G for source 0. Each branch of this tree is a GMCR. The downstream route $r_e$ corresponding to each such branch can be uniquely specified by the end node $e \in V$ in the branch. The route $r_e$ is established on-demand. However, the NC does not need to send updates for a set of gmcn to each node $i \in r_e$ for all other nodes in re which are downstream to i. It needs to send an update for only one gmcn to each $i \in r_e$.

A downstream message needs to carry end node e and the final destination of the message. When a node receives this message, and if it is not the intended destination, then it will forward the message to the gmcn that it has received previously associating the route $r_e$. With this on-demand and sparse update approach, the route update overheads are kept to a minimum. At the same time, downstream message routing is simple as that for an upstream message. Such an approach does not carry any routing specification and does not impose any ceiling on the number of message hops.

When a branch of the SPT splits into sub-branches, the node at which it sub-branches receives and manages multiple gmcn for each downstream sub-branch. In the example approach, there is no further routing update overhead, and the complete route specification is carried with each downstream message. Since the source of all such messages is the NC, it can attach an accurate and optimized routing specification to the message. At this time, the network is no less than weakly synchronized.

FIG. 4H shows the procedure Xmit Downstream 200. Like its upstream transmit counterpart of FIG. 4F, the procedure 200 of FIG. 4H is used to initiate a message, albeit a downstream message. However, unlike the procedure 204 of FIG. 4F, only the NC uses the procedure 200 of FIG. 4H since it initiates all downstream messages. There are two major differences between these two procedures 204, 200. First, in the only step 216 of the procedure 200 of FIG. 4H, the entire routing specification $r_{0d}^{gmc}$ is attached as part of the $Msg_{ds}$ and this route is the GMCR for the given source and destination. Routing specification $r_{0d}^{gmc}$ is readily available from step 184 of the procedure 166 of FIG. 4E which computes and saves all such GMCRs to each possible destination. The NC forwards the message to the corresponding $gmcn_{0d}=SSMCR^0(1)$. Secondly, $Msg^{ds}$ does not have to carry the source address 0 as every destination node knows this a priori. The destination node needs to know this address since it sends a confirmation back to the source node upon receiving the message.

FIG. 4I shows the procedure Process Downstream Msg 218. This procedure 218 is invoked when a downstream message $Msg_{ds}$ is received at the current node i from a node j. Only a node i≠0 can receive this message. In step 220 of this procedure 218, the current node did not receive this message incorrectly or accidentally violating routing specification carried in the message. If the current node is the intended final destination, then, in step 222, it sends a receipt confirmation to the NC using the upstream procedure 204 of FIG. 4F. In step 224, the message is suitably processed to end its life.

If the current node is just an intermediate hopping node, in step 226, it removes its address from the route specification and then ascertains that the new route specification is not empty. In step 228, it simply forwards the message to the first node in the revised route specification.

Each graph is implemented as an adjacency list since these graphs are very sparse in a real wireless sensor network application. A key consideration is the computation of $SSMCR^0$ and $SDMCN^0$ in steps 186 and 184, respectively, of the procedure 166 of FIG. 4E. $SSMCR^0$ is computed by applying Dijkstra's single source shortest path algorithm on G from source 0. The algorithm computes first the shortest path tree (SPT). $SSMCR^0$ can then be easily computed from the SPT. The implementation preferably employs a conventional minimum priority queue data structure. The algorithm complexity for this approach to computation is $O(E \log(V))$.

$SDMCN^0$ is computed from Equation 16. To compute this, first compute $SDMCR^0$ from Equation 15. The Dijkstra algorithm computes the SPT for a single source to all other destination. In order to apply, the Dijkstra algorithm computes the SPT for a single destination, after first taking the transpose of graph G to compute $G^T$. The transpose operation just changes the direction of all the edges in the original graph G. Then, the Dijkstra algorithm is applied on $G^T$ to compute a new SPT taking node 0 as the source (not destination) node. $SDMCR^0$ can then be easily computed from this SPT. GT can be computed in O(E) time. Hence, the overall time to compute $SDMCR^0$, and thus $SDMCN^0$ is still $O(E \log(V))$.

Another important aspect is short address allocation. In wireless sensor networks, every node is assigned a globally unique fixed address which is 8 bytes in length. It is expensive to use this long address with each message. Instead, the network preferably issues and manages a short address to each member node that is locally unique. In other words, the address is unique only within the given network. The short address is typically limited to 2 bytes in length. The implementation preferably serially allocates the vertex numbers for each new node. This same number is used as the short address for the node. Hence, the short address allocation and maintenance is simplified by following the graph based approach. If a node leaves the network permanently, then its short address will be available to be assigned to the next new node.

The disclosed PSRg approach optimizes the storage of routing data at the NC, while simultaneously extracting more implicit information about routing and network topology from it.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An ad-hoc network comprising:
    an ad-hoc network coordinator comprising:
        a first processor,
        a first memory, and
        a first communication interface; and
    a plurality of ad-hoc network devices, each of said ad-hoc network devices comprising:
        a second processor,
        a second memory, and
        a second communication interface structured to communicate with the first communication interface of said ad-hoc network coordinator or with the second communication interface of at least another one of said ad-hoc network devices,
    wherein the second processor of each of said ad-hoc network devices is structured to determine a local graph,
    wherein said local graph of a corresponding ad-hoc network device comprises:
        a set of vertices corresponding to all of said ad-hoc network devices that the corresponding ad-hoc network device can communicate with,
        a set of edges connecting said vertices, and
        a set of link costs associated with said edges,
        wherein each vertex of said vertices corresponds to one of said ad-hoc network devices that the corresponding ad-hoc network device can communicate with, and
        wherein each edge of said edges links the corresponding ad-hoc network device to one vertex of said vertices,
    wherein the second processor of each of said ad-hoc network devices is further structured to send the local graph to said ad-hoc network coordinator, wherein the first processor of said ad-hoc network coordinator is structured to determine a global graph from the union of the local graph of each of said ad-hoc network devices, and wherein said first processor employs said global graph and cooperates with at least some of said ad-hoc network devices to globally optimize a route in said ad-hoc network for: (i) pairs of said ad-hoc network devices, or (ii) pairs of said ad-hoc network devices and at least one pair including one of said ad-hoc network devices and said ad-hoc network coordinator, in order to minimize cost along said route that: (a) one of said ad-hoc network devices or said ad-hoc network coordinator employs to send a packet to: (b) another one of said ad-hoc network devices or said ad-hoc network coordinator.

2. The ad-hoc network of claim 1 wherein said route includes at least one of said ad-hoc network devices other than said one of said ad-hoc network devices and said other one of said ad-hoc network devices.

3. The ad-hoc network of claim 1 wherein the corresponding ad-hoc network device is structured to build and maintain said local graph to manage packet routing locally for the corresponding ad-hoc network device; and wherein said ad-hoc network coordinator is structured to build and maintain said global graph to manage packet routing globally for said ad-hoc network.

4. The ad-hoc network of claim 3 wherein said local graph is a smaller subset of said global graph.

5. The ad-hoc network of claim 1 wherein said ad-hoc network is a wireless sensor network.

6. The ad-hoc network of claim 1 wherein said ad-hoc network is a low rate wireless personal area network.

7. The ad-hoc network of claim 1 wherein the second processor of each of said ad-hoc network devices is further structured to update said link costs associated with said edges, and to intermittently send said local graph with said updated link costs to said ad-hoc network coordinator.

8. The ad-hoc network of claim 1 wherein the second processor of each of said ad-hoc network devices is further structured to update one of said link costs associated with a corresponding one of said edges, and to send said local graph with said updated one of said link costs to said ad-hoc network coordinator.

9. A method for determining routing of packets of an ad-hoc network comprising an ad-hoc network coordinator and a plurality of ad-hoc network devices, said ad-hoc network devices communicating with said ad-hoc network coordinator or with at least another one of said ad-hoc network devices, said method comprising:
  determining a local graph for each of said ad-hoc network devices, wherein said local graph of a corresponding ad-hoc network device comprises:
    a set of vertices corresponding to all of said ad-hoc network devices that the corresponding ad-hoc network device can communicate with,
    a set of edges connecting said vertices, and
    a set of link costs associated with said edges,
    wherein each vertex of said vertices corresponds to one of said ad-hoc network devices that the corresponding ad-hoc network device can communicate with, and
    wherein each edge of said edges links the corresponding ad-hoc network device to one vertex of said vertices;
  sending the local graph from each of said ad-hoc network devices to said ad-hoc network coordinator;
  determining a global graph from the union of the local graph of each of said ad-hoc network devices;
  for: (i) pairs of said ad-hoc network devices, or (ii) pairs of said ad-hoc network devices and at least one pair including one of said ad-hoc network devices and said ad-hoc network coordinator globally optimizing a route in said ad-hoc network based on said global graph; and
  minimizing cost along said route that: (a) one of said ad-hoc network devices or said ad-hoc network coordinator employs to send a packet to: (b) another one of said ad-hoc network devices or said ad-hoc network coordinator.

10. The method of claim 9 further comprising
  employing said one of said ad-hoc network devices as a source node;
  employing said other one of said ad-hoc network devices as a destination node;
  employing as said route a global minimum cost route, which includes at least one of said ad-hoc network devices other than said one of said ad-hoc network devices and said other one of said ad-hoc network devices; and
  employing as a first element of said global minimum cost route a first global minimum cost neighbor of said source node.

11. The method of claim 10 further comprising
  employing a single source minimum cost route function for said source node;
  determining a plurality of global minimum cost routes from said source node to each of the other ones of said ad-hoc network devices;
  employing said global minimum cost routes as a set of routes;
  determining a plurality of global minimum cost neighbors corresponding to said global minimum cost routes; and
  determining for each of said global minimum cost routes a set including at least one minimum cost neighbor for said source node.

12. The method of claim 10 further comprising
  employing as a second element of said global minimum cost route a second global minimum cost neighbor of said first global minimum cost neighbor; and
  employing at least one successive global minimum cost neighbor terminating at said destination node.

13. The method of claim 9 further comprising
  for at least one of said ad-hoc network devices:
    discovering a route when powered up, reset or when isolated from said ad-hoc network;
    learning about some of said ad-hoc network devices as being neighbor ad-hoc network devices;
    informing said ad-hoc network coordinator about said neighbor ad-hoc network devices; and
    receiving from said ad-hoc network coordinator a recommendation about which one of said neighbor ad-hoc network devices to use for sending upstream packets toward said ad-hoc network coordinator, in order to maximize routing efficiency or minimize routing cost.

14. The method of claim 13 further comprising
  for said one of said ad-hoc network devices, completing said discovering a route for said neighbor ad-hoc network devices;
  informing said ad-hoc network coordinator of said neighbor ad-hoc network devices;
  discarding any prior global minimum cost neighbor;
  selecting the upstream local minimum cost neighbor from the corresponding one of said local graphs;
  sending a first update message to said upstream local minimum cost neighbor including said corresponding one of said local graphs; and receiving a second update message from said ad-hoc network coordinator.

15. The method of claim 14 further comprising
receiving said first update message at said upstream local minimum cost neighbor;
for said upstream local minimum cost neighbor, selecting a corresponding upstream local minimum cost neighbor from the corresponding one of said local graphs;
forwarding said first update message to the last said corresponding upstream local minimum cost neighbor including the corresponding one of said local graphs of said one of said ad-hoc network devices; and
forwarding said first update message to said ad-hoc network coordinator.

16. The method of claim 9 further comprising
for each of said ad-hoc network devices, building and maintaining a corresponding said local graph to manage routing locally for a corresponding one of said ad-hoc network devices; and
for said ad-hoc network coordinator, building and maintaining said global graph to manage routing globally for said ad-hoc network.

17. The method of claim 16 further comprising
for the corresponding one of said ad-hoc network devices, discovering some of said ad-hoc network devices as being neighbor ad-hoc network devices;
discarding the corresponding said local graph;
broadcasting a request message to at least one of said neighbor ad-hoc network devices;
responsively receiving a response message from at least one of said neighbor ad-hoc network devices; and
updating the corresponding said local graph with two vertices, an edge and a link cost associated with said response message from a corresponding one of said at least one of said neighbor ad-hoc network devices to said one of said ad-hoc network devices.

18. The method of claim 17 further comprising
for the corresponding one of said at least one of said neighbor ad-hoc network devices, receiving said request message;
employing said link cost as a first link cost;
determining a second link cost from said one of said ad-hoc network devices to said corresponding one of said at least one of said neighbor ad-hoc network devices; and
broadcasting said response message including the second link cost.

19. The method of claim 18 further comprising
for said one of said ad-hoc network devices, receiving said response message including the second link cost;
determining the first link cost from said corresponding one of said at least one of said neighbor ad-hoc network devices to said one of said ad-hoc network devices;
adding said corresponding one of said at least one of said neighbor ad-hoc network devices as an upstream vertex in the corresponding one of said local graphs; and
adding an edge from said corresponding one of said at least one of said neighbor ad-hoc network devices to said one of said ad-hoc network devices.

20. The method of claim 19 further comprising
sending a confirm message to said corresponding one of said at least one of said neighbor ad-hoc network devices indicating acceptance as a downstream neighbor; and
receiving another response message from another one of said at least one of said neighbor ad-hoc network devices.

21. The method of claim 9 further comprising
employing upstream routing if the ad-hoc network coordinator is the final destination of a packet sent by one of said ad-hoc network devices; and
employing a global minimum cost neighbor defined by said ad-hoc network coordinator as an initial destination of said packet sent by one of said ad-hoc network devices.

22. The method of claim 21 further comprising
for another one of said ad-hoc network devices, joining said ad-hoc network;
receiving a global minimum cost neighbor for said other one of said ad-hoc network devices as defined by said ad-hoc network coordinator;
employing upstream routing if the ad-hoc network coordinator is the final destination of another packet sent by said other one of said ad-hoc network devices; and
employing the last said global minimum cost neighbor as an initial destination of said other packet sent by said other one of said ad-hoc network devices.

23. The method of claim 9 further comprising
employing downstream routing when said ad-hoc network coordinator sends a packet to one of said ad-hoc network devices.

24. The method of claim 23 further comprising
for said ad-hoc network coordinator, updating one of said ad-hoc network devices with a set of global minimum cost neighbors for each possible destination of packets to each of the other ones of said ad-hoc network devices.

25. The method of claim 24 further comprising
receiving said packet to one of said ad-hoc network devices at another one of said ad-hoc network devices;
for said other one of said ad-hoc network devices, determining the corresponding global minimum cost neighbor; and
forwarding said received packet to said determined corresponding global minimum cost neighbor.

26. The method of claim 25 further comprising
including the address of said determined corresponding global minimum cost neighbor in said forwarded packet; and
employing no routing specification in said forwarded packet.

27. The method of claim 23 further comprising
for said ad-hoc network coordinator, updating on demand selected ones of said ad-hoc network devices with corresponding global minimum cost neighbors for a particular downstream destination on demand;
establishing a route to a downstream destination after one of said ad-hoc network devices needs to initially send a packet to said particular downstream destination; and
after said establishing a route, each intermediate one of said ad-hoc network devices maintaining a corresponding global minimum cost neighbor for said particular downstream destination.

\* \* \* \* \*